United States Patent [19]

Terauchi

[11] Patent Number: 4,594,049

[45] Date of Patent: Jun. 10, 1986

[54] ROBOT ARTICULATION DEVICE

[75] Inventor: Tsuneo Terauchi, Aichi, Japan

[73] Assignee: Mitsubishi Denki Kabushiki Kaisha, Tokyo, Japan

[21] Appl. No.: 510,862

[22] Filed: Jul. 5, 1983

[30] Foreign Application Priority Data

Jul. 2, 1982 [JP] Japan ................................ 57-114908

[51] Int. Cl.⁴ .................................................. B66C 23/00
[52] U.S. Cl. .................................... 414/744 R; 901/28; 414/730
[58] Field of Search ..................... 901/15, 21, 28, 29; 414/744 R, 744 A, 729, 730

[56] References Cited

U.S. PATENT DOCUMENTS

| 4,030,617 | 6/1977 | Richter | 901/29 X |
| 4,431,366 | 2/1984 | Inaba et al. | 901/29 X |
| 4,518,308 | 5/1985 | Grzybowski et al. | 901/15 X |
| 4,540,332 | 9/1985 | Nakashima et al. | 901/23 X |

FOREIGN PATENT DOCUMENTS

| 44737 | 1/1982 | European Pat. Off. | 901/15 |
| 72786 | 2/1983 | European Pat. Off. | 901/21 |
| 5611789 | 2/1979 | Japan . | |
| 5662778 | 10/1979 | Japan . | |
| 655621 | 4/1979 | U.S.S.R. | 901/15 |

*Primary Examiner*—Leslie J. Paperner
*Assistant Examiner*—Dennis Williamson
*Attorney, Agent, or Firm*—Sughrue, Mion, Zinn, Macpeak and Seas

[57] ABSTRACT

The robot articulation device includes a first arm pivoted on a support stand for rotation about a first axis and a second arm is pivotally mounted on the free end of the first arm for rotational movement about a second axis. The first and second axes may be vertically or horizontally disposed. Opposed recessed are located in the first and second arms concentric with the second axis and a sleeve secured to one of the arms extends into the recess in the other arm. A projection is secured to the other arm and extends into the sleeve and bearings are disposed between the projection and the sleeve and the sleeve and the recess, respectively. A gear reduction unit is located in the other recess and is provided with an input shaft which may be driven from a drive motor mounted on the support stand.

7 Claims, 7 Drawing Figures

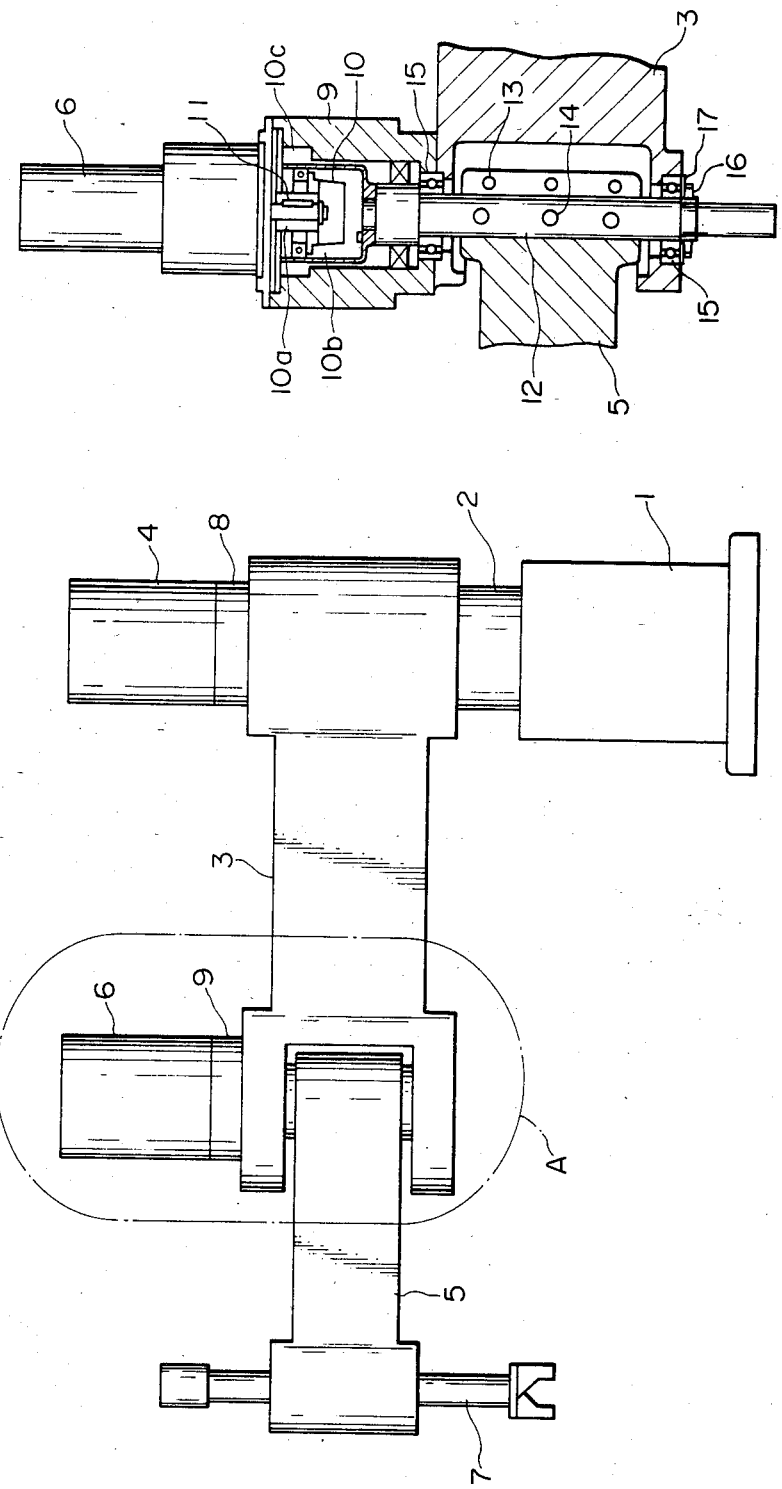

ROBOT ARTICULATION DEVICE

BACKGROUND OF THE INVENTION

The present invention relates to industrial robots and more particularly to improvements in the articulation of a first arm on a base member, a second arm on the remote end of the first arm, and the transmission means for imparting movement to said second arm relative to said first arm.

A conventional horizontal articulation type industrial robot is shown in FIGS. 1-3, inclusive, and is comprised of a first horizontally disposed arm 3 rotatably mounted on a stationary vertical shaft 2 which in turn is secured to a stand 1. A first arm drive motor 4 is secured to the end of the first arm 3 which is pivotally mounted on the shaft 2 by suitable bearing means. A second horizontally disposed arm 5 is pivotally mounted on the free end of the first arm 3 for rotation about a vertically disposed shaft. A conventional tool, such as a gripping hand 7, is coupled to the free end of the second arm 5. A drive motor 6 for rotating the second arm 5 is mounted on the free end of the first arm 3. Planet type reduction gears are located within the housings 8 and 9 for operatively coupling the drive motors 4 and 6 to the first arm 3 and the second arm 5, respectively.

The details of the conventional planet type reduction gearing between the first and second arms is shown in FIG. 2 which is a sectional view of the portion in FIG. 1 designated by the reference numeral A. The planet type reduction gearing 10 located within the housing 9 is comprised of an input element 10a which is fixed for rotation with the drive shaft of the drive motor 6 by means of a key 11. An output element 10b which is in the form of a cup whose outer wall is provided with a number of small teeth, is connected to an output shaft 12 for rotation therewith. The teeth on the cup-shaped output element 10b are adapted to mesh with the teeth 10c which are secured to the housing 9. The output shaft 12 is rigidly connected to the second arm 5 by means of bolts 13 and pins 14 so that upon rotation of the output shaft 12 the second arm 5 will rotate relative to the first arm 3 about a vertical axis defined by the axis of the output shaft 12 and the drive shaft of the motor 6. The output shaft 12 is rotatably mounted in bearings 15 formed in the end of the first arm 3. The output shaft 12 is restrained against axial movement by means of a nut 16 threaded on the end thereof and a bearing washer 17 interposed between the nut 16 and the bearing 15.

In the operation of the conventional horizontal articulation type robot as disclosed in FIGS. 1 and 2, the first arm 3 and the second arm 5 are of substantially similar construction and therefore the operation of the second arm only will be described. The second arm drive motor 6 is rotated in accordance with instructions received from a separate non-illustrated control device. The rotation of the motor 6 is transmitted through the reduction gear 10 so that the rotation is reduced in accordance with a reduction gear ratio. The output shaft 12 secured to the output element of the reduction gear 10 is therefore rotated at a lower speed. This rotation causes the second arm 5 to swing about the axis defined by the output shaft 12 with a minimal amount of play due to the arrangement of the bearings 15, bearing nut 16 and bearing washer 17. The first arm 3 is swung about the vertically disposed axis of the stationary shaft 2 upon operation of the drive motor 4, the output shaft of which is coupled to the first arm 3 by means of a single gear reduction.

In the conventional horizontal articulation type robot disclosed in FIGS. 1-3, the second arm drive motor 6 is provided on the free end of the first arm so that when the first arm is driven, the inertial load on the first arm drive motor 4 is quite large. Furthermore, the second arm 5 is supported by the ball bearing 15 at the free end of the first arm as shown in FIG. 2, and accordingly the longitudinal length of the first arm is quite large, thereby substantially increasing the weight of the first arm 3 along with the inertial moment. Therefore, in order to operate the conventional robot at high speeds, it is essential that the first arm drive motor 4 is provided with a relatively large drive capacity. Thus, the conventional robot is disadvantageous in that it becomes unnecessarily bulky and heavy.

Furthermore, in the conventional robot, as shown in FIGS. 1-3, the end portion of the first arm 3 is recessed in the form of a gate for supporting the second arm 5. Therefore, if the operating range of the second arm 5 is relatively large, as shown in FIG. 3, than the recessed portion has to be increased accordingly, thereby decreasing the rigidity of the arm. Thus, the conventional robot suffers from the disadvantage that it is necessary to increase the thickness of the portions of the arm defining the gate in order to increase the rigity of the arm. The problem can be solved by making the operating range of the arm smaller, but this is also disadvantageous for obvious reasons. Finally, the conventional robot suffers from a further disadvantage inasmuch as the first and second motors are located on the first arm 3, thereby creating a complicated power supply and control arrangement for the motors due to the difficulty in leading wires to the respective motors.

Japanese Patent Publication No. 55-112789 discloses a robot similar to that disclosed in FIGS. 1-3 of the present application inasmuch as the motor for driving the first horizontally disposed arm about a vertical pivot shaft on a support member is mounted on the support member whereas the second motor for driving a second horizontally disposed arm about the second vertical pivot shaft carried by the free end of the first arm is mounted on the free end of the first arm in alignment with the second pivot shaft. Thus, the weight of the first arm is substantially increased and due to the gate type supporting arrangement for both the first and second arms, the range of pivotal movement of the first and second arms is substantially restricted.

Japanese Patent Publication No. 56-62778 discloses a different form of robot wherein the first arm is pivoted for movement about a support intermediate the ends of the first arm. A second arm is pivotally mounted on one end of the first arm and the drive motor of the second arm is mounted at the opposite end of the first arm. A drive shaft extends through the first arm to drive suitable gearing located in the gate type connection between the first and second arms. Thus, the first arm carries the extra weight of the motor and the gate type connection between the first and second arms limits the freedom of the second arm.

SUMMARY OF THE INVENTION

The present invention provides a new and improved robot articulation device which eliminates all of the above-mentioned difficulties accompanying a conventional robot articulation device. More specifically, the present invention provides a robot articulation device which allows an increase in the operating region of the second arm while minimizing the inertial moment of each arm in rotation thereby allowing the robot to operate at higher speeds with a higher degree of accuracy.

The present invention provides a new and improved robot articulation device wherein a first arm is pivotally mounted at one end thereof on a support stand for rotational movement about the first axis, a second arm pivotally mounted on the free end of said first arm for rotational movement about a second axis, first drive means for rotating said first arm about said first axis including a first motor mounted on said support stand and second drive means for rotating said second arm about said second axis, including a drive motor mounted on said support stand, an input shaft rotatably mounted in the free end of said first arm for rotation about said second axis, a timing pulley carried by said input shaft, timing belt means connecting said second motor to said timing pulley, first and second opposed recesses located in said first and second arms respectively, concentric with said second axis, a sleeve secured to one of said first and second arms and extending into the recess in the other of said first and second arms, first bearing means interposed between said sleeve and the respective recess whereby said second arm may be rotated 360° about said second axis, projection means secured to the other of said first and second arms and projecting into said sleeve coaxially therewith, second bearing means interposed between said sleeve and said projection means and reduction gear means interposed between said input shaft and said second arm for transmitting rotation from said input shaft to said second arm at a reduced speed.

The foregoing and other objects, features and advantages of the invention will be apparent from the following more particular description of preferred embodiments of the invention as illustrated in the accompanying drawings.

BRIEF DESCRIPTION OF THE DRAWINGS

FIG. 1 is a side elevation view showing a conventional horizontal articulation type robot.

FIG. 2 is a sectional view showing the articulation between the first and second arms of the conventional horizontal articulation type robot shown in FIG. 1.

DETAILED DESCRIPTION OF THE INVENTION

Figure 4:
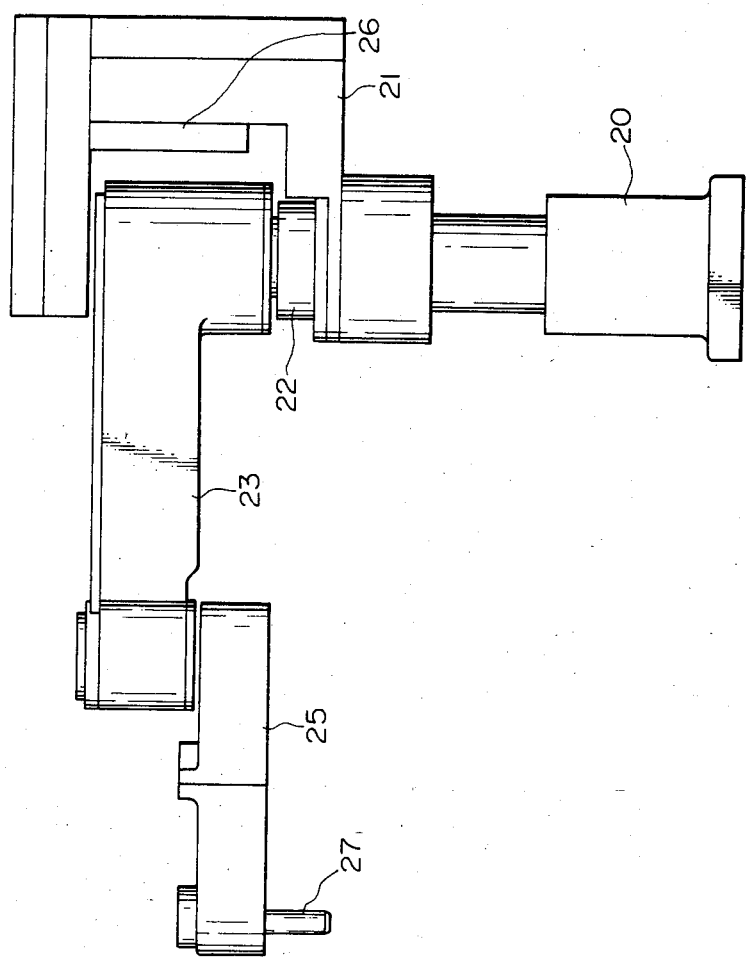
FIG. 4 is a side elevation view of a horizontal articulation type robot utilizing an articulation device according to the present invention.
Figure 3:
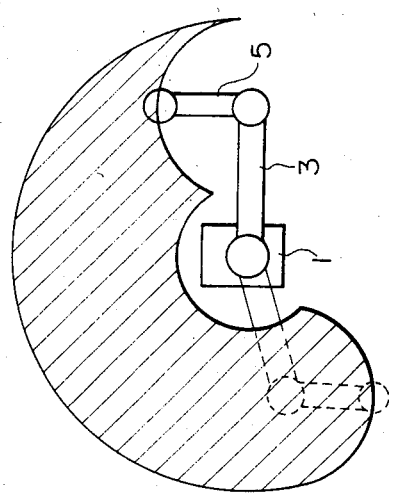
FIG. 3 is an explanatory diagram showing the operating range of the conventional horizontal articulation type robot shown in FIG. 1.

The robot articulation device according to the present invention may be incorporated in a horizontal articulation type robot such as shown in FIG. 4. In this type of robot, a C-shaped gate 21 is mounted upon a support stand 20 for pivotally supporting a first horizontally disposed arm 23 for rotation about a vertically disposed axis. The drive motor (not shown) for the first arm 23 may be located within the support base 20 and may be operably coupled to the first arm 23 through a suitable gear reduction mechanism 22. A second horizontally disposed arm is pivotally mounted for rotation about a second vertically disposed shaft at the free end of the first arm 23. The drive motor 36 for driving a second arm is carried by the C-shaped gate member 21 and is operatively connected to the second arm 25 through suitable transmission means disposed within the first arm 23. A suitable tool 27 is carried at the free end of the second arm 25. The drive arrangement from the motor 26 to the second arm 25 is similar to that disclosed in U.S. Pat. application Ser. No. 478,122, filed Mar. 23, 1983, which is assigned to the same assignee as the present application.

Figure 5:
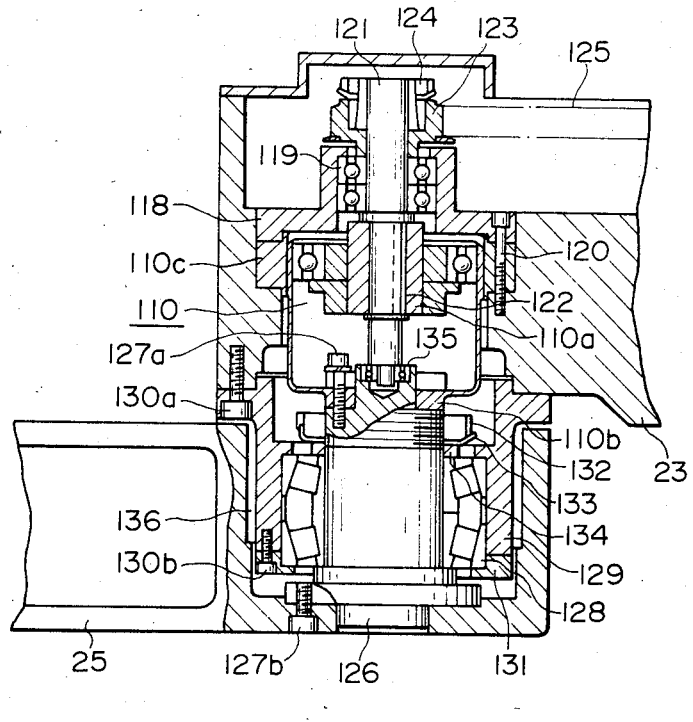
FIG. 5 is a sectional view showing a first embodiment of the articulation structure between the first and second horizontally disposed arms of the robot shown in FIG. 4.

The detailed means for pivotally connecting the second arm 25 to the first arm 23 and for driving the second arm 25 through a gear reduction means is shown in FIG. 5 in the present application. A bearing support member 118 and a gear ring having stationary internal teeth 110c are secured in a recess in the free end of the arm 23 by means of bolts 120. A shaft 121 is rotatably supported within the bearing support plate 118 by means of bearings 119. A timing pully 123 is secured to the upper end of the input shaft 121 by means of a tightening element 124 and a timing belt 125 is entrained about the pulley 123. The timing belt 125 is driven by the motor 126 in accordance with the transmission arrangement disclosed in the aforementioned co-pending U.S. Patent Application. An input element 110a of the reduction gear assembly 110 is secured to the middle portion of the input shaft 121 by means of a key 122.

An output shaft 126 is secured in a recess in the end of the second arm 25 by means of bolts 127b. An output element 110b of the reduction gear 110 is secured to the upper end of the output shaft 126 by means of bolts 127a. The upper end of the output shaft 126 is provided with a recess in which the lower end of the input shaft 121 is rotatably mounted by means of a ballbearing unit 135. The full details of the gear reduction mechanism 110 are old and well known in the art and need not be described in detail.

A support sleeve 129 is secured to the lower surface of the free end of the first arm 23 by means of bolts 130a. The sleeve extends into the recess in the second arm 25 and is rotatably supported therein by means of a plain bearing sleeve 136 interposed between the sleeve 129 and the second arm 125. A tapered roller bearing unit 128 is interposed between the output shaft 126 and a support sleeve 129 and is held in position by means of a bearing retainer 131 which is secured to the end of the sleeve 129 by bolts 130b and a bearing nut and washer 132, 133, secured on the upper end of the output shaft 126 in abutting relation to an adjusting collar 134 which bears against the inner race of the bearing unit 128.

In the horizontal articulation type robot thus constructed, the first arm 23 is turned at a low speed as rotation of the first arm drive motor is transmitted through the reduction gear unit 22 to arm 23. The second arm 25 is rotated by the drive motor 26 axially secured to the C-shaped extension 21 of the stationary stand 20. The rotation motor 26 is transmitted through the timing belt 125 to the timing pulley 123 on the input shaft 121 of the gear reduction unit 110. The timing pulley 123 is secured to the input shaft 121 by means of the tightening element 124 so that there is no axial play whatsoever as would be obtained with a key type connection, such as shown in FIG. 2. Furthermore, a more accurate phase adjustment can be more readily achieved. The output shaft 126 of the gear reduction unit 110 is secured to the second arm 25 by means of the bolts 127b.

The second arm 125 may be relatively small in width, but is provided with a high degree of rigidity so that it is supported through the clearance-adjusted tapered roller bearing 128 on the end of the first arm 23. The stability of the second arm is increased by employing the plain sleeve bearing 136. However, the bearing 136 may be eliminated in the case where the second arm does not require such rigid stability as in the case of a robot designed for very light load work.

The input shaft 121 is co-axially disposed relative to the output shaft and is rotatably supported by the output shaft 126 through the bearing 135. Therefore, the stability of the second arm bearing can be increased and the accuracy of the rotary shaft of the planet type gear reduction unit 110 can be increased.

In the articulation structure described above with respect to FIG. 5, the gear reduction unit 110 is built into the first arm 23 and the bearing members are built into the second arm 25 which makes it possible to miniturize the articulation. Accordingly, the first arm drive motor's load inertial moment can be reduced and the drive motor may be relatively small in capacity for a high speed operation. Since the transmission elements, namely the timing belt 125 and the timing pulley 123 are arranged on the input shaft side of the reduction gear unit 110, elongation of the belt or backlash in the engagement can be minimized on the output shaft side thereby permitting the transmission mechanism to operate with a high degree of accuracy. While taper rolling bearings are employed, these bearings may be replaced by angular ball bearings in the case where the robot handles light loads. The employment of cross roller bearings may also contribute to the reduction of the weight and size of the robot.

Figure 6:
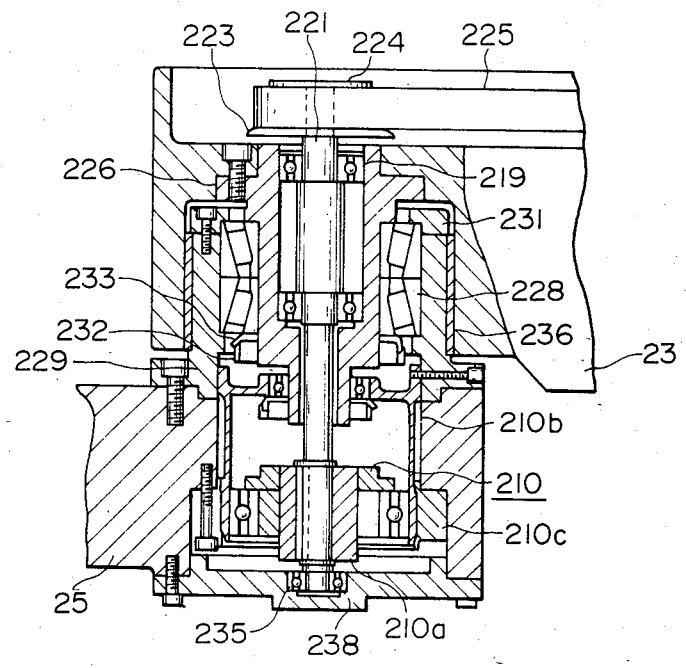
FIG. 6 is a sectional view showing a second embodiment of the articulation structure between the first and second horizontally disposed arms of the robot shown in FIG. 4.

In the above described embodiment of FIG. 5, a reduction gear unit 110 is built into a first arm 123 and the bearing means are incorporated into the second arm 125. However, the same effect may be obtained by modifying the articulation as shown in FIG. 6 wherein the gear reduction unit is incorporated in the second arm 25 and the bearing means is incorporated in the first arm 23. The timing belt 225, which is driven in the same manner as the timing belt 125, is entrained about the timing pulley 223 secured on the upper end of the input shaft 221 by means of the fastener element 224. The input shaft 221 is rotatably supported by means of bearings 219 in the stationary support sleeve 226 which is secured in a recess in the free end of the arm 23. A second support sleeve 229 is secured to the end of the second arm 25 and extends upwardly into the recess in the end of the first arm 23. A plain bearing sleeve 236 is interposed between the support sleeve 229 and the first arm 223 and a tapered roller bearing unit 228 is interposed between the first support sleeve 226 and the second support sleeve 229. The bearing retaining plate 231 is secured to the upper end of the support sleeve 229 and a bearing support ring 232 is carried on the lower end of the stationary support sleeve 226 by means of a support nut 232 threaded thereon. The input member 210a of the gear reduction unit 210 is secured to the lower end of the input shaft 221 and the output element 210b of the gear reduction unit 210 is secured to the second arm 25. A support plate 238 is secured over the recess in the second arm 25 and the lower end of the input shaft 221 is rotatably supported in a recess in the support plate 238 by means of a bearing unit 235. Thus, the entire support bearing assembly is located within the recess of the free end of the first arm and the gear reduction unit is located completely within a recess in the end of the second arm which is pivoted upon the free end of the first arm for 360° rotation.

Figure 7:
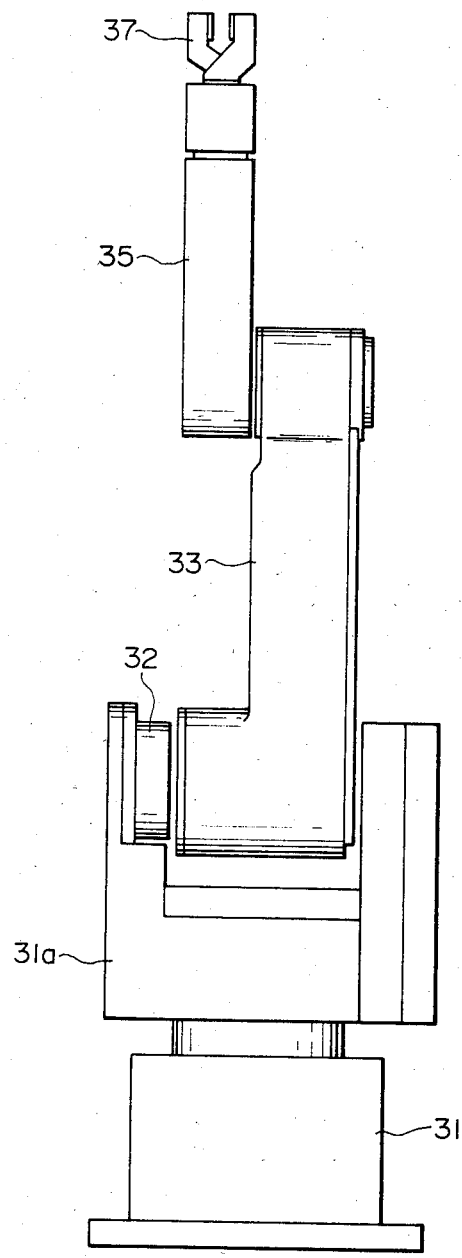
FIG. 7 is a side elevation view of a vertical arm type robot using the articulation device according to the present invention.

While the invention has been described with respect to the situation in FIG. 4 where the articulation is applied to a horizontal articulation type robot, it should be understood that the invention is not limited thereto, and the articulation structure of the present invention may be applied to a vertical arm type robot such as that shown in FIG. 7. In this case, a C-shaped support bracket 31a is secured on the upper end of the support stand 31 and the first arm 33 rotates about a horizontally disposed axis and is driven through a horizontally disposed gear reduction unit 32 from a suitable drive motor (not shown) located within the support stand 31. An articulation type connection, similar to that shown in either FIG. 5 or FIG. 6, may be interposed between the first arm 33 and the second arm 35 with the input and output shafts thereof being disposed horizontally. A suitable gripping device or other tool 37 is carried in the conventional manner on the free end of the second arm 35. As in the previous embodiment, the drive motor for the second arm is carried in the support bracket 31a. Thus, the weight of the first arm can be reduced and accordingly the inertial movement can be decreased thereby providing a robot which can operate at high speeds with a high degree of accuracy over a wide operating range.

While the invention has been particularly shown and described with reference to a preferred embodiment thereof, it will be understood by those in the art that there foregoing and other changes in form and details may be made therein without the departing from the spirit and scope of the invention.

What is claimed is:

1. A robot articulation device comprising a support stand, a first arm pivotally mounted at one end thereof on said support stand for rotational movement about a first axis, a second arm pivotally mounted on the free end of said first arm for rotational movement about a second axis parallel to said first axis, first drive means for rotating said first arm about said first axis including a first motor mounted on said support stand and second drive means for rotating said second arm about said second axis including a second drive motor mounted on said support stand, an input shaft rotatably mounted in the free end of said first arm for rotation about said second axis, transmission means interconnecting said input shaft and said second drive motor, first and second opposed recesses located in said first and second arms respectively concentric with said second axis, a sleeve secured to one of said first and second arms and extending into the recess in the other of said first and second arms, first bearing means interposed between said sleeve and the respective recess whereby said second arm may be rotated 360° about said second axis, projection means secured to the other of said first and second arms and projecting into said sleeve co-axially therewith, second bearing means interposed between said sleeve and said projection means and reduction gear means interposed between said input shaft and said second arm for transmitting rotation from said input shaft to said second arm at a reduced speed.

2. A robot articulation device as set forth in claim 1 wherein said sleeve is secured to the free end of said first arm and extends into said recess in said second arm and said projection means is secured to said second arm and extends into said second sleeve.

3. A robot articulation device as set forth in claim 2 wherein said first bearing means is comprised of a plain sleeve bearing and said second bearing means is comprised of a tapered roller bearing unit.

4. A robot articulation device as set forth in claim 1 wherein said sleeve is secured to said second arm and extends into said recess in said first arm and said projection means is comprised of a support sleeve secured to said first arm and extending into said sleeve on said second arm, said input shaft being rotatably supported within said support sleeve.

5. A robot articulation device as set forth in claim 4 wherein said first bearing means is comprised of a plain sleeve bearing unit and second bearing means is comprised of a tapered roller bearing unit.

6. A robot articulation device as set forth in claim 1 wherein said first and second axes are horizontally disposed.

7. A robot articulation device as set forth in claim 1 wherein said first and second axes are vertically disposed.

* * * * *